United States Patent [19]
Davis

[11] Patent Number: 5,318,156
[45] Date of Patent: Jun. 7, 1994

[54] RIGID VOLUME VISCOUS DAMPER

[75] Inventor: Lawrence P. Davis, Phoenix, Ariz.

[73] Assignee: Honeywell Inc., Minneapolis, Minn.

[21] Appl. No.: 991,025

[22] Filed: Dec. 15, 1992

[51] Int. Cl.$^5$ .................... F16F 9/04; F16F 9/08
[52] U.S. Cl. .................... 188/298; 188/312; 188/316; 248/636
[58] Field of Search .......... 188/298, 312, 316, 322.5; 267/122, 140.11, 150, 217; 248/562, 636

[56] References Cited

U.S. PATENT DOCUMENTS

| | | | |
|---|---|---|---|
| 2,936,860 | 5/1960 | Peras | 188/298 |
| 3,107,752 | 10/1963 | McLean | 188/322.5 X |
| 3,266,603 | 8/1966 | Kamimoto | 188/298 X |
| 4,241,816 | 12/1980 | Hubrecht et al. | 188/298 |
| 4,760,996 | 8/1988 | Davis | 267/122 |
| 4,768,627 | 9/1988 | Taylor | 188/312 X |

FOREIGN PATENT DOCUMENTS

| | | | |
|---|---|---|---|
| 219929 | 9/1988 | Japan | 188/316 |
| 1421959 | 9/1988 | Japan | 188/298 |

OTHER PUBLICATIONS

Wilson et al., "Viscous Damped Space Structure for Reduced Jitter" 58th Shock & Vibration Symposium, Aug. 1987.
Davis et al., "An Advanced D-Strut TM", 1991 Conference San Diego, Calif.
Davis et al., "Workshop on Structural Dynamics in Control Interaction of Flexible Structures", NASA, Mar. 1989.
Anderson et al., "Testing and Application of a Viscous Passive Damper for use in Precision Truss Structure", American Institute of Aeronautics and Astronautics, Inc., 1991.
Davis et al., "New Structure Design Criteria Offer Improved Point and Lower Weight", 59th Shock and Vibration Symposium, Albuquerque, N.M., Oct. 1988.
Wilson et al., "Very High Damping in Larger Space Structures"; ASME Vibration Conference, Boston, Mass.
Cunningham et al., "A Multi-Axis Isolation System for the French Earth Observation Satellite's Magnetic Bearing Reaction Wheel", Proceedings of the AD-PA/AIAA/ASME/SPIE Conference or Active Materials in Adaptive Structures, Nov. 507, 1991.

*Primary Examiner*—Andres Kashnikow
*Assistant Examiner*—Kevin D. Rutherford
*Attorney, Agent, or Firm*—Thomas A. Rendos

[57] ABSTRACT

A damping apparatus including a piston having an axis therethrough. The piston includes a coaxial body portion and a first and second end extending oppositely therefrom along the axis. A rigid housing is coaxial with and surrounds the body of the piston for forming a rigid fluid volume between the piston and the rigid housing. The rigid fluid volume includes a first fluid chamber at a first end of the piston and a second fluid chamber at the second end of the piston. The first and second fluid chambers are connected by a damping path. The damping apparatus further includes a flexible housing coupled to the first and second ends of the piston and surrounding the rigid housing to form a fluid return of lower resistance to flow than the damping path between the rigid housing and the flexible housing and to allow movement of the rigid housing with respect to the piston. The rigid housing forms a first and second restrictive path about the first and second ends of the piston, respectively, of higher resistance to flow than the damping path to allow fluid to flow between the fluid return and the rigid fluid volume.

23 Claims, 6 Drawing Sheets

RIGID VOLUME VISCOUS DAMPER

FIELD OF THE INVENTION

The present invention pertains to the field of damping. In particular, this invention relates to a rigid volume viscous damper for providing damping and isolation for structures or devices having extremely low vibration levels and/or very high levels.

BACKGROUND OF THE INVENTION

Precision structures are susceptible to disturbances that can produce structural vibrations. Since precision structures, such as precision truss structures for space, bridge, or building applications, tend to have little inherent damping, these vibrations can lead to serious performance degradation. An efficient means of adding damping to large precision structures in a controlled manner is of considerable importance. Both active and passive damping techniques have been utilized. However, active systems suffer from high cost, low reliability, and poor low-level or threshold performance. On the other hand, passive damping systems require no power, are often less expensive than active damping devices and do not drive the structure unstable. Thus, passive damping systems have proven to play a significant role in the overall design of large precision structures.

There are several manners of implementing passive damping in a structure such as a truss structure. Two of the more common methods are viscoelastic damping and viscous damping. Both such methods can be incorporated into strut-like elements for use in truss structures. Viscoelastic damping methods have been in widespread use in vibration absorbing applications and are often applied in panel-like structures. These devices, though capable of providing isolation or damping for most applications, exhibit cyclic wear and excessive sensitivity to temperature and are susceptible to other environmental conditions.

Viscous dampers include a fluid reservoir sealed in a damping structure which utilizes viscous fluid sheer forces to provide damping. One particular viscous damper is described in U.S. Pat. No. 4,760,996 to Davis issued Aug. 2, 1988 and assigned to Honeywell Inc. The viscous damper described therein achieves common axis and which is attached to an end piece and a base at opposite ends of the shaft; the shaft maintaining a fixed separation distance therebetween. A piston having an axial bore hole and a flange extending therefrom for coupling to a load is positioned about the shaft in a coaxial relationship forming a fluid annulus between the piston and the shaft. A first and second bellows are positioned in axial alignment with the shaft and are fluidly sealed at opposite ends of the bellows by the end piece and the base, respectively, and the flange to form two fluid chambers therein. A fluid gap couples the fluid chambers in the first and second bellows that are formed between the piston, inner walls of the bellows and the flange extension from the piston. This arrangement obtains damping by purely viscous fluid sheer forces. As the load attached to the flange moves, the volume of one chamber increases while the volume of the second decreases. The overall volume, due to the fixed distance between the end piece of the first bellows and the base piece of the second bellows maintained by the shaft, remains constant. Thus, fluid of constant volume that is contained within the two chambers and the gap is distributed to the chambers in accordance with the movement of the load providing a damping function.

A viscous damper such as described in U.S. Pat. No. 4,760,996 has several associated problems. The damping potential of such a viscous damper is partly determinable by the axial compliancy of the bellows. The pressure in the chambers of the viscous damper is determined by the fluid in the chambers and is distributed variably to the bellows in accordance with the velocity of the load. The expansion of the bellows due to the pressure reduces the fluid shear forces through the fluid annulus with a resultant loss in damping. Thus, the ability to dampen large loads and/or handle loads of high velocity is diminished. In order to prevent the bellows from expanding in a manner to increase their volume, or in other words volumetric expansion, when pressure is increased in a chamber, the bellows must be kept relatively stiff. Because of the necessary stiffness, due to the potential pressure in the chamber being relatively high, a decrease in the relative possible stroke along the axis of the viscous damper results. In addition, in order to keep the fluid gap continually retained between the piston and the shaft to prevent contact and friction therebetween, the bellows must also be made relatively stiff to prevent the bellows from extending in a radial direction due to volumetric expansion. Such stiffness once again decreases the stroke potential of the viscous damper.

A viscous damping technique which offers high damping for truss structures is the D-Strut ™ as described in "Viscous Damped Space Structure for Reduced Titter," by J. F. Wilson and L. P. Davis, 58th Shock and Vibration Symposium, August 1987. The D-Strut ™ which is used to replace a nominal type strut in a truss structure includes a small viscous damper placed in series with an inner tube and the damper and inner tube are placed in parallel with an outer tube. An axial displacement across the strut produces a displacement across the damper. The damper forces a fluid through a small diameter orifice causing a shear in the fluid and providing viscous damping for the structure. The damper is basically two compliant cavities connected by the small diameter orifice. The compliancy of the cavities reduces the shear forces when a pressure of the fluid in the compliant cavities causes the cavity volume to change. Thus, a resultant loss in damping occurs. However, the D-Strut ™ provides much higher damping capabilities.

As indicated above, there are various problems with regard to both viscoelastic damping devices and viscous devices. Therefore, there is a need to provide isolation and damping which can withstand environmental conditions, application of cyclic forces and which is structured such that minimal pressure is applied to flexible portions of the viscous damping structure so as to allow for maximum stroke capability and/or to afford large load or high velocity capability.

SUMMARY OF THE INVENTION

The present invention is directed to a viscous damper apparatus and method which provides a large load or damping capability, a large stroke capability and improved performance over previous viscous dampers. The damping apparatus includes a piston having an axis therethrough. The piston includes a coaxial body portion and a first and second end which extend oppositely from the body portion along the axis. A rigid housing is coaxial with and surrounds the body of the piston for forming a rigid fluid volume between the piston and the rigid housing. The rigid fluid volume includes a first fluid volume chamber at the first end of the piston and a second fluid volume chamber at the second end of the piston. The first and second fluid volume chambers are connected by a damping path. A flexible housing is coupled to the first and second ends of the piston and surrounds the rigid housing to form a fluid return of lower resistance to flow than the damping path between the rigid housing and the flexible housing and to allow movement of the rigid housing with respect to the piston. The rigid housing forms a first and second restrictive path about the first and second ends, of the piston, respectively, of higher resistance to flow than the damping path to allow fluid to flow between the fluid return and the rigid fluid volume.

In another embodiment of the invention, the flexible housing includes a cylindrical outer retainer coaxial with the axis of the piston. The retainer has a first and second end. A first diaphragm is centered on and retains the first end of the piston while also sealing the first end of the retainer. A second diaphragm is centered on and retains the second end of the piston while sealing the second end of the retainer. The rigid housing is sized with respect to the retainer so as to retain first and second annuluses about the first and second ends of the pistons when a load is applied to the damping apparatus to prevent contact and friction between the rigid housing and the piston.

In a further embodiment of the present invention, the rigid housing includes a radial member coaxial with the body portion of the piston and extending from the rigid housing for connecting to and receiving a load. The fluid return extends through this radial member. Further, the flexible housing includes an upper and lower base member coupled to the first and second ends of the piston, respectively. The flexible housing also includes a first bellows having a first end connected to the upper base member of the piston and a second end connected to the radial member forming the first fluid volume chamber, and it also includes a second bellows having a first end connected to the lower base member of the piston and a second end connected to the radial member forming the second fluid volume chamber. Further, the first and second high resistance paths include annuluses between the rigid housing and the first and second ends of the piston, respectively. The first and second bellows are of a material having a stiffness such that the annuluses are retained about the first and second ends of the piston when a load is applied to the damping apparatus to prevent contact and friction between the rigid housing and the piston.

In another embodiment of the invention, the damping path, the first and second restrictive paths, and the fluid return are sized to keep a pressure in the fluid return low as compared to the rigid fluid volume, whereby the flexible housing can be compliant to permit a large stroke while achieving a high load and/or high velocity damping capability.

In a further embodiment of the invention, the damping apparatus includes a member having an axis therethrough. A first housing forms a fluid volume about and coaxial with the axis. The member includes means for separating the fluid volume into a first fluid chamber and a second fluid chamber connected by a damping path for providing damping of applied forces. A second housing coaxial with the axis provides a fluid return about the first housing having a resistance to flow lower than a resistance to flow of the damping path and to allow movement of the first housing with respect to the member. A first high resistance path is provided about the member for flow of fluid between the fluid return and the first fluid chamber and a second high resistance path is provided about the member for flow of fluid between the fluid return and the second fluid chamber. Each high resistance path having a resistance to flow greater than the resistance to flow of the damping path.

In the method of the present invention, a member is provided which has a body portion extending radially from and coaxial with an axis therethrough. A contained fluid volume about the member is further provided. The fluid volume is separated into a first and second fluid volume portion by the body portion of the member. A damping path between the first and second fluid volume portions is provided along with a sealed fluid return about the contained fluid volume. The fluid return has a resistance to flow less than the damping path. A pressure is increased in the first fluid volume portion. A first flow of fluid from the first volume portion to the second volume portion through the damping path is effected by the increase in pressure. A second flow from the first volume portion to the fluid return through a high resistance flow path having resistance to flow greater than the damping path is further effected. When the pressure in the first volume portion is decreased, fluid is returned to the first volume portion from the fluid return through the high resistance flow path and from the second fluid volume portion through the damping path, whereby a load increasing the pressure in the first fluid volume portion is damped by the damping path with a minimal pressure in the sealed fluid return.

DESCRIPTION OF THE PREFERRED EMBODIMENT

Figure 1:
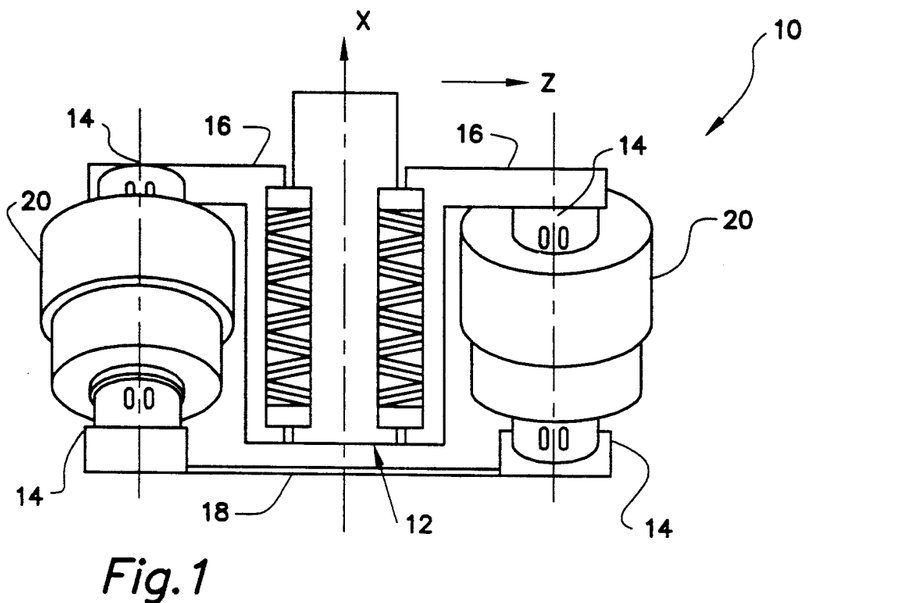
FIG. 1 is a front view of a bipod of two viscous dampers of the present invention.
Figure 2:
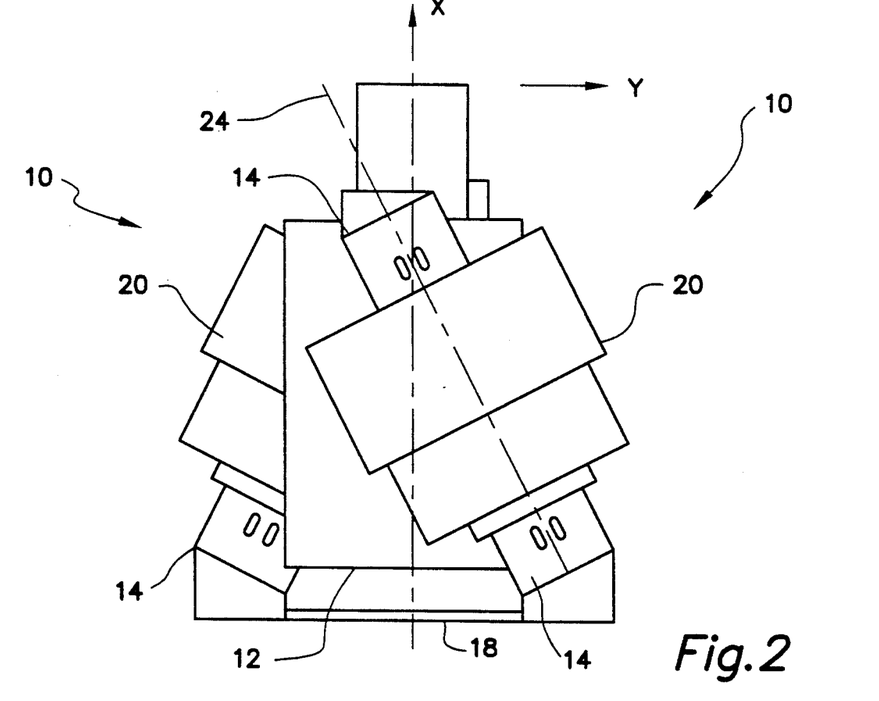
FIG. 2 is a side view of the bipod of FIG. 1.

Two viscous dampers 20, in accordance with the principles of the present invention, are shown in a bipod damper layout 10 in FIGS. 1–2. The viscous dampers 20 are mounted on either side of a load limiter 12 by load attachment members 16. The two viscous dampers 20 are mounted in a triangular shape and have flexural pivots 14 at each end of the viscous dampers 20. One of the flexural pivots is coupled to the load limiter 12 and the other pivot is coupled to ground 18. The plane of the triangle is orientated to correspond to the Z direction in which the bipod offers negligible resistance to motion. For motion in either the X or Y directions, the viscous dampers 20 of the bipod are forced into extension or compression along their axis 24. Forces, both stiffness and damping, are transferred to the X and Y axis through the flexural pivots 14. The flexural pivots 14 at each end of the viscous dampers have two angular degrees of freedom. The pivots 14 consist of two bending elements machined into a solid cylinder at a right angle and they introduce little or no friction into the system.

Figure 6:
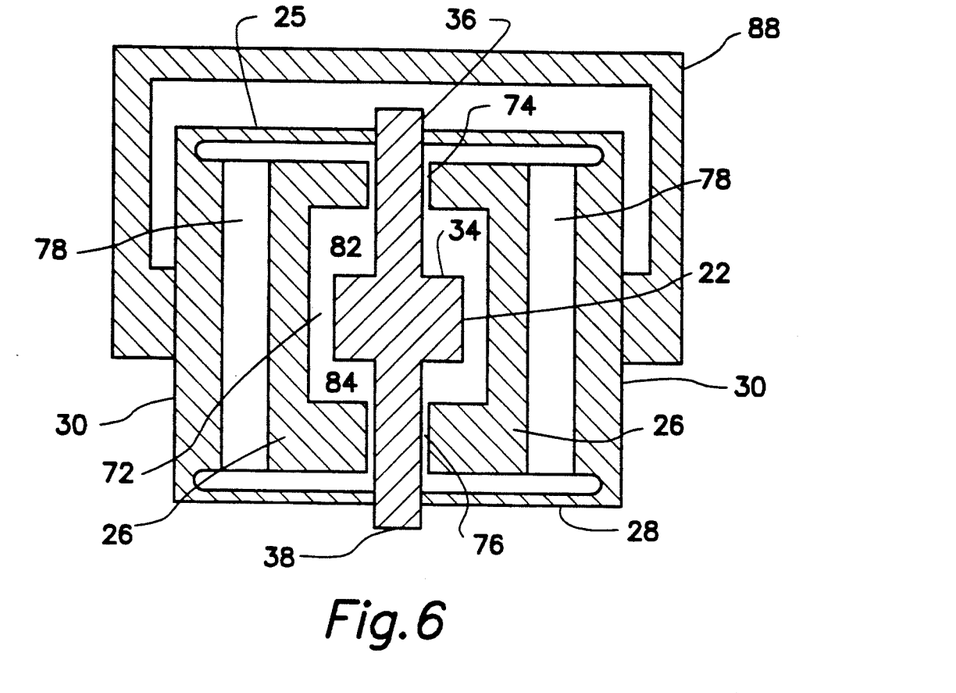
FIG. 6 is a schematic diagram of the viscous damper of FIGS. 3, 4 and 5.

Generally, in accordance with the present invention, the viscous damper 20 as shown in the schematic diagram of FIG. 6 includes three fluid annuluses: a damping annulus 72, a sealing annulus, which includes a first and second sealing annulus 74 and 76, and a fluid return 78. The three fluid annuluses are sized so that only the damping annulus 72 actually provides the damping function for the rigid volume viscous damper 20 with a series stiffness that is extremely high. As a downward load or force is applied to a load coupling 88, a rigid housing 26 is moved along a piston 22 and fluid is forced from a contracting volume 82 above the piston through the damping annulus 72 to an expanding volume 84 below a piston body 34 of piston 22. The resistance to fluid flow of the sealing annuluses 74, 76 is very high relative to the damping annulus 72, so there is negligible flow through the sealing annuluses 74, 76. The fluid return 78 is created by a flexible housing about rigid housing 26. The flexible housing includes retainer housing 30 and diaphragms 25, 28. The fluid return 78 is parallel with the damping annulus 72 but its resistance to fluid flow is much lower than the damping annulus 72, thus, the force developed as a result of the fluid sheer through the fluid return 78 is negligible.

Pressure seen by the retainer 30 and diaphragms 25, 28 about the rigid housing 26, is that due to the flow resistance of the fluid return 78. Since the resistance to fluid flow therethrough is low relative to that of damping annulus 72, such pressure will be very low. In addition, the series stiffness of the viscous damper 20 will be extremely high because only the fluid moving through the damping annulus 72 is compressed and because the housing 26 is relatively rigid compared to the retainer housing 30 and diaphragms 25, 28. The volumetric stiffness of the flexible housing including the retainer housing 30 and diaphragms 25, 28 is of less importance since this flexible housing is not subjected to any great pressure force. This allows for a flexible housing having axial compliance for greater stroke capability. Because of the rigid volume stiffness, the design is referred to as the "rigid volume" viscous damper and provides proportionally higher damping capabilities as compared to less rigid dampers known in the art.

Figure 3:
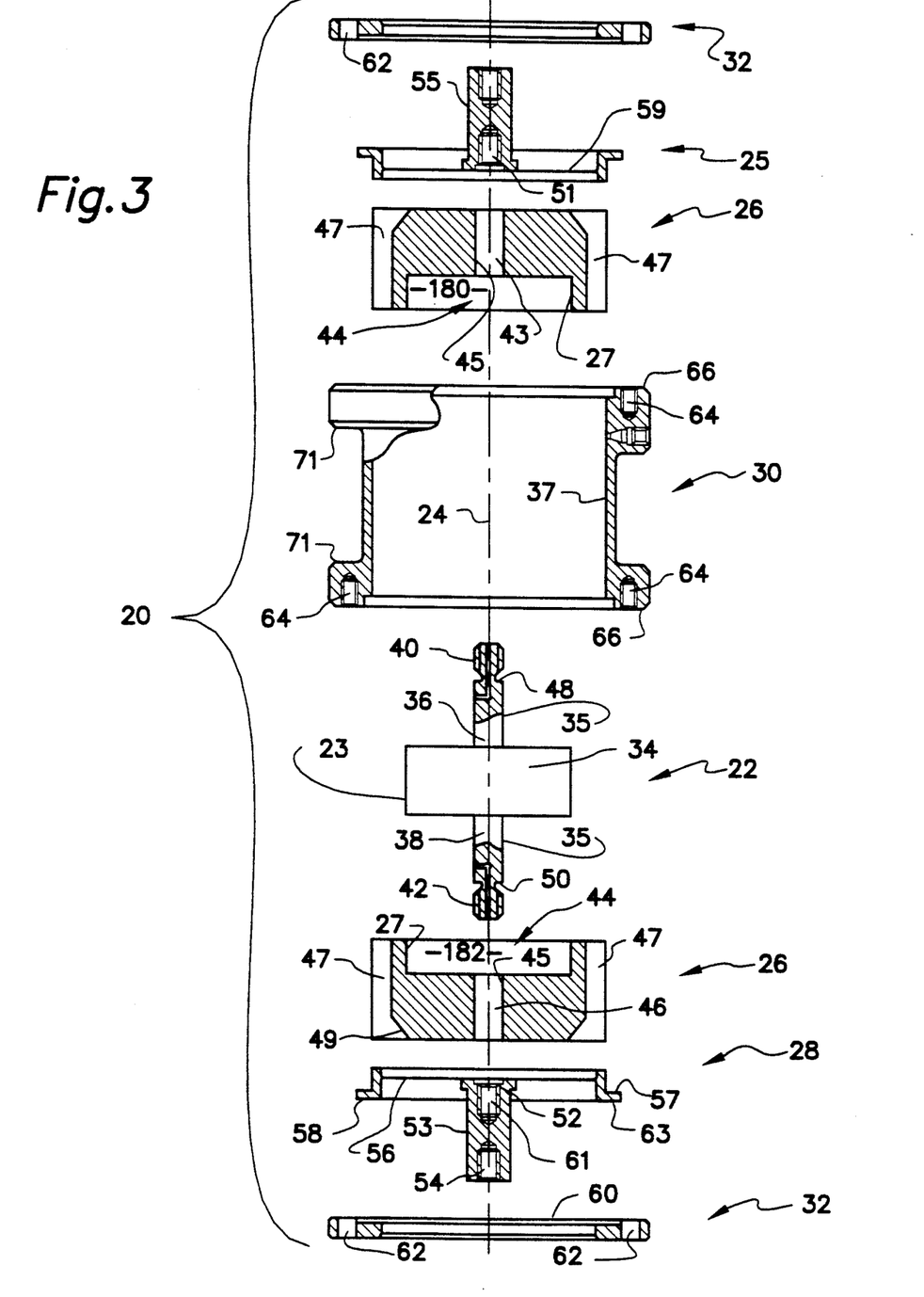
FIG. 3 is an exploded cross-sectional view of the viscous damper of the present invention.

More specifically and in accordance with the present invention, further detail of the viscous damper 20 shall be provided in reference to the exploded view of viscous damper 20 as shown in FIG. 3 and in reference to FIGS. 4–7. Viscous damper 20 includes a piston 22 having a cylindrical body 34 extending radially from axis 24. The piston body 34 has an outer surface 23 at a predetermined radial distance from axis 24. The piston 22 further includes two ends 36, 38 which extend oppositely from the piston body 34 along axis 24. Piston end 38 includes an outer diameter surface 35 located a predetermined distance radially from axis 24. At the far end from the piston body 34, the piston end 38 includes a head 42 sized for tight engagement in a diaphragm hub 53 to be described further below. Between the head 42 and the remainder of piston end 38 is an end surface 50 sized for engagement with a locking notch 52 of diaphragm hub 53 also explained further below. In accordance with the symmetry of the piston 22, piston end 36 also includes an outer diameter surface 35, a head 40 for engagement with diaphragm hub 55, and an end surface 48 sized for engagement with locking notch 51 of diaphragm hub 55.

Piston 22 is sized such that piston body 34 is inserted into a chamber 44 of a rigid housing 26 when two sections 180, 182 of rigid housing 26 as shown in the exploded view of FIG. 3 are pinned together. Upon insertion of piston body 34 into chamber 44 of rigid housing 26, piston end 38 of piston 22 is guided through an aperture 46 bored into section 182 of rigid housing 26 and piston end 36 of piston 22 is guided through aperture 43 bored into section 180 of rigid housing 26. Rigid housing 26 further includes a plurality of slots 47, best shown in FIG. 5, along an outer diameter surface 29 of rigid housing 26. Each of slots 47 include slant ends 49 for allowing ease of fluid flow with low resistance because the flow area is large as will be described further below. The rigid housing 26 has a first inner surface 27 which lines the chamber 44 of rigid housing 26 facing the outer diameter surface 23 of piston body 34, a second inner surface 45 lining the apertures 43, 46 facing piston ends 36, 38, and the outer diameter surface 29 radially at a predetermined distance and coaxial about axis 24.

The head 42 of piston 22 is sized so as to be insertable into a channel 61 of diaphragm hub 53 of a diaphragm 28. The diaphragm 28 includes a flexible portion 56 made from titanium or other high strength spring material extending radially from the hub 53 to an outer diaphragm portion 58 at a predetermined radial distance from the axis 24. Diaphragm 28 can be a single or multi-layered diaphragm. Outer diaphragm portion 58 includes an outer surface 63 facing outward from the piston body 34 and an inner surface 57 facing inward toward the piston body 34. A second diaphragm 25 engages head 40 of piston 22 in channel 51 in the same manner as previously described with regard to diaphragm 28 at the opposite end of the viscous damper 20. The cavity 54 of the diaphragm hub 53 of the diaphragm 28 is for attachment of the viscous damper 20 to ground or to load by appropriate means.

The piston 22, rigid housing 26, and opposed diaphragms 25, 28 are inserted into a retainer housing 30. The retainer housing 30 is a cylindrical retainer coaxial with axis 34 at a predetermined radial distance therefrom. The retainer housing 30 includes an inner surface 37 sized substantially the same as outer diameter surface 29 of rigid housing 26. Fastener receiving cavities 64 are positioned about the opposing ends of the retainer housing 30 in an outer ring 71 thereof. Retainer receiving surfaces 66 face outward from the retainer housing 30 in oppositely facing directions. The retainer receiving surfaces 66 positioned in oppose relation facing outward from the piston body 34 are sized to receive the inner surface 57 of diaphragm outer portion 58 of diaphragm 28 along the inside of the outer ring 71. A diaphragm clamp 32 is provided for sandwiching the outer diameter portion 58 of diagram 28 between the retainer housing 30 and diaphragm clamp 32 with an appropriate O-ring 68, FIG. 4. The diaphragm clamp 32 includes a notch 60 sized so as to receive the outer surface 63 of diaphragm outer portion 58. Fastener apertures 62 on the diaphragm 32 allow for appropriate fasteners to attach the diaphragm clamp 32 to the retainer housing 30 by way of fastener cavities 64 so as to seal the diaphragm 28 on the end of retainer housing 30. Diaphragm 25 is coupled to the other elements at the opposite end of the viscous damper 20 in a similar manner to that described so that the two diaphragms 25, 28 seal the opposing ends of retainer housing 30.

Figure 4:
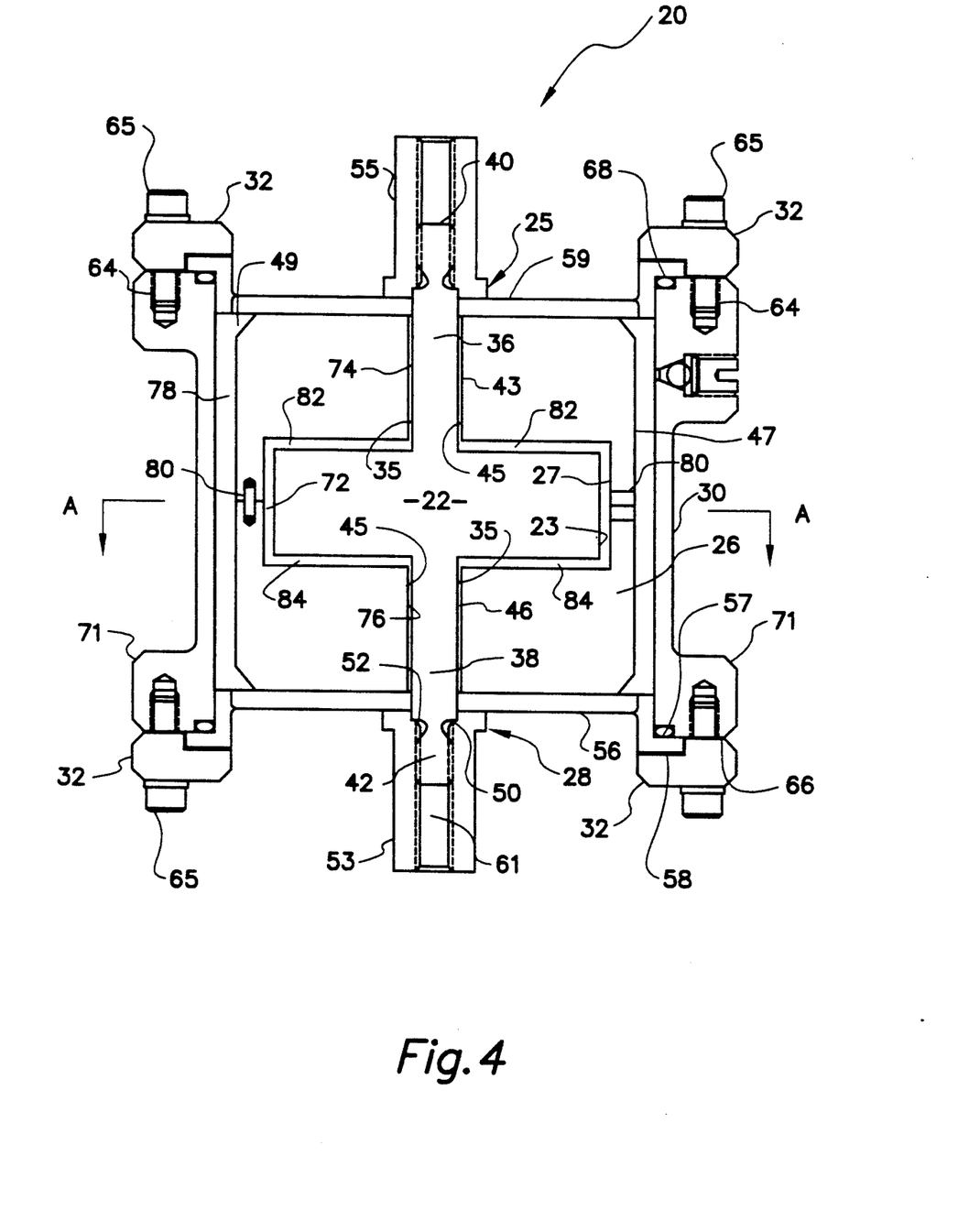
FIG. 4 is a cross-sectional view of an assembled viscous damper utilizing the components shown in exploded detail in FIG. 3.
Figure 5:
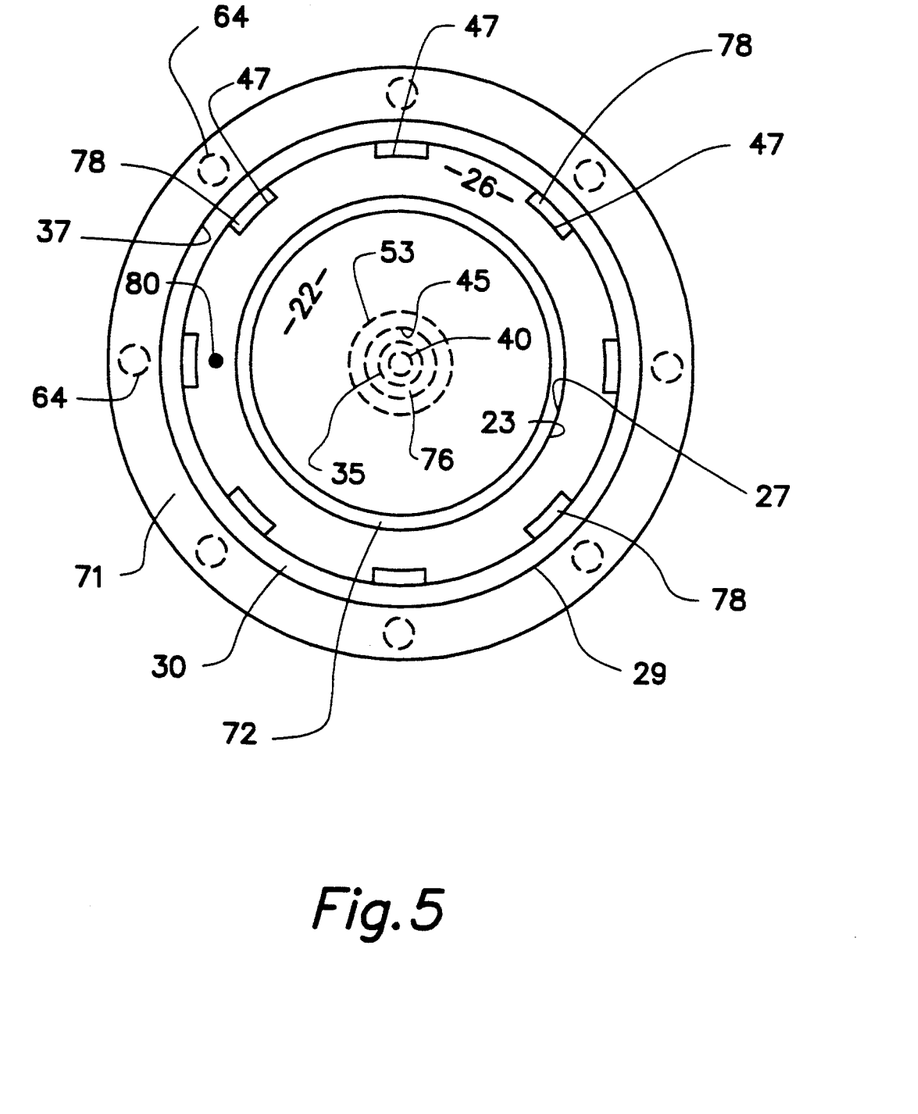
FIG. 5 is a cross-sectional view taken at line A of the viscous damper of FIG. 4.

The assembled viscous damper 20 including the components of the exploded view, FIG. 3, is shown in FIG. 4. FIG. 5 is a cross-sectional view at line A—A of the assembled viscous damper 20 of FIG. 4. As assembled, the components of FIG. 3 form a hermetically sealed fluid volume containing a silicone fluid. As shown in each of FIGS. 4–7, the viscous damper 20 includes various paths for fluid flow as provided by the assembled viscous damper components. Upon the assembly of piston 22 and rigid housing 26 a fluid volume chamber is created about piston body 34. The two sections 180, 182 of rigid housing 26 as shown in FIG. 3 are pinned together by pins 80 with the ends 36, 38 of piston 22 extending through apertures 43, 46 of the respective portions of rigid housing 26. The rigid housing 26 surrounding the piston 22 creates an upper rigid volume 82 between the piston body 34 and section 180 of rigid housing 26 and a lower rigid volume 84 between the piston body 34 and section 182 of rigid housing 26. A damping annulus 72 is further created between the outer surface 23 of the piston body 34 and the inner surface 27 of the rigid housing 26, as best shown in FIG. 5. Damping annulus 72, as will be explained further below, provides for the damping function of the viscous damper 20. In addition, assembly of rigid housing 26 about piston ends 36, 38 form two sealing annuluses 74, 76 between the outer diameter surface 35 of the piston ends 36, 38 and the inner diameter surfaces 45 of the apertures 43, 46 of rigid housing 26.

Enclosing the piston 22 and rigid housing 26 within a flexible housing hermetically seals the fluid volume within the viscous damper 20. The flexible housing includes retainer housing 30 and diaphragms 25, 28 coupled to the housing 30 by diaphragm clamps 32. The flexible housing provides a fluid return 78 created between rigid housing 26 and retainer housing 30 via slots 47. The slots 47 of rigid housing 26 are equally spaced about the outer diameter surface 29 of rigid housing 26. The slots 47 run along the entire axial length of the rigid housing 26 and form integral channels for fluid return with passages between rigid housing 26 and diaphragms 25, 28 for transfer of fluid through sealing annuluses 74, 76. In order to retain fluid in the annuluses 74, 76, on a continuous basis, the heads 40, 42 of the respective piston ends 36, 38 are centered in diaphragms 25, 28 and the components of the viscous damper 20 are sized in the manner as explained below.

Head 42 of piston 22 is inserted into channel 61 such that the end surface 50 and outer diameter surface 35 of piston end 38 is a tight fit with logging notch 52. The diaphragm 28 is coupled to the retainer housing 30 with the appropriate hardware 65 and diaphragm clamp 32 after insertion of the piston 22, rigid housing 26, and portions of diaphragm 28 therein. Thus, the hub 53 and piston end 38 locked therein is centered within the retainer housing 30. Because the outer surface 29 of rigid housing 26 is sized so as to be a tight fit within the inner surface 37 of retainer housing 30, the rigid housing 26 is prevented from moving in the radial direction. In conjunction with the centering of the piston 22 in hubs 53, 55, the annuluses 74, 76 are continuously retained open with fluid therein. The retention of fluid within annuluses 74, 76 prevents inner surface 45 of rigid housing 26 from contact and friction with outer diameter surfaces 35 of piston ends 36, 38. Such prevention permits viscous damper 20 to perform its damping function without wear on the piston 22 and rigid housing 26 and prevents damping to be performed by Coulomb forces from such friction. When such friction occurs, viscous dampers tend to stick and a certain amount of force is necessary to overcome such sticking prior to any purely viscous damping being accomplished. When considering the small vibrational forces associated with space-type structures, such friction resulting in sticking is unacceptable.

Because of the small size of some of the various fluid paths in the viscous damper 20, the figures could not be drawn proportionately and are somewhat skewed. The sizing of the fluid paths provide for a viscous damper 20 which allows for damping of large loads and high velocity damping capabilities within the rigid fluid volume chambers 82, 84 through damping path 72. The relative size of the various fluid paths will be described, followed by a description of the function of such fluid paths in the viscous damper 20. The sealing annuluses 74, 76 have a very high resistance to fluid flow therethrough. A gap of about 0.008 inches about the piston ends 36, 38 is provided between the inner diameter surface 45 lining apertures 46, 43 and outer diameter surface 35 of the piston ends 36, 38. The damping path 72 is much less restrictive to fluid flow than the sealing annuluses 74, 76 in that the gap between the inner surface 27 lining chambers 44 of rigid housing 26 and the outer surface 23 of piston body 34 is about 0.08 inches. The fluid return 78 through slots 47 which number eight equally distributed slots 47 about the outer diameter surface 29 of rigid housing 26 provide the least resistance to fluid flow. The slots 47 in rigid housing 26 when surrounded by retainer housing 30 create a composite cross-sectional area for the slots 47 for fluid return 78 of about 0.824 square inches. This area is compared to about 0.48 square inches in cross-sectional area of damping annulus 72 around piston body 34 and relative to less than about 0.0065 inches in cross-sectional area for each sealing annulus 74, 76.

With reference to FIG. 6 and with consideration of the relative resistance to flow of the fluid paths in the viscous damper 20, the function of the fluid paths is described. A load is applied via load coupling 88 to retainer housing 30 with piston end 38 coupled to base or ground. With the load applied, rigid housing 26 moves axially along piston 22. Fluid is forced from volume chamber 82 because of contraction therein, through the damping annulus 72 to an expanding fluid chamber 84. Because of the high resistance to flow of the sealing annulus 76 there is negligible fluid flow through the annulus 76 because of the movement of rigid housing 26. The fluid through fluid return 78, which has a resistance to flow which is much less than damping annulus 72, will apply pressure in the slots 47 and between the diaphragms 25, 28 and the rigid housing 216, causing a fluid sheer which is negligible. The pressure seen by the flexible portions of diaphragms 25, 28 is due only to the minimal flow resistance of fluid return 78.

It is important that the pressure on the flexible housing, which includes the retainer housing 30 and diaphragms 25, 28, surrounding the rigid housing 26 be kept low. This allows the diaphragms 25, 28 to be made much thinner to accommodate large strokes for vibrational damping. Because the pressure is much lower in the present invention across the flexible portion of diaphragms 25, 28 about rigid housing 26, the stiffness of the diaphragm flexible portion 56, 59 of diaphragm 25, 28 need only be determined by that necessary to provide a radial stiffness necessary to retain sealing annuluses 74, 76 open and fluid therein. The only fluid compressed in the viscous damper 20 is the fluid moving through the damping annulus 72. It is this rigid fluid volume movement between the chambers formed between the rigid housing 26 and piston 22 which provides for vibrational damping in the viscous damper 20. The sheer through the damping annulus 72 dissipates energy and provides vibration damping. The viscous damper 20 has a flexible portion allowing for large stroke because fluid pressure is low and volumetric expansion is decreased in the fluid return 78. The damper 20 also has a rigid volume portion which is rigid enough to damp large forces without decreasing the stroke potential. Thus, the viscous damper 20 is suitable for many applications, including damping low vibrational and/or high vibrational levels.

It should be readily apparent to one skilled in the art that the retainer housing 30 could also be coupled to ground and the load attached to the piston instead of the housing 30. In such a case, the piston 22 would move along axis 24 and compress the fluid in a chamber 82, 84 of the rigid volume between the rigid housing 26 and piston 22.

Figure 7:
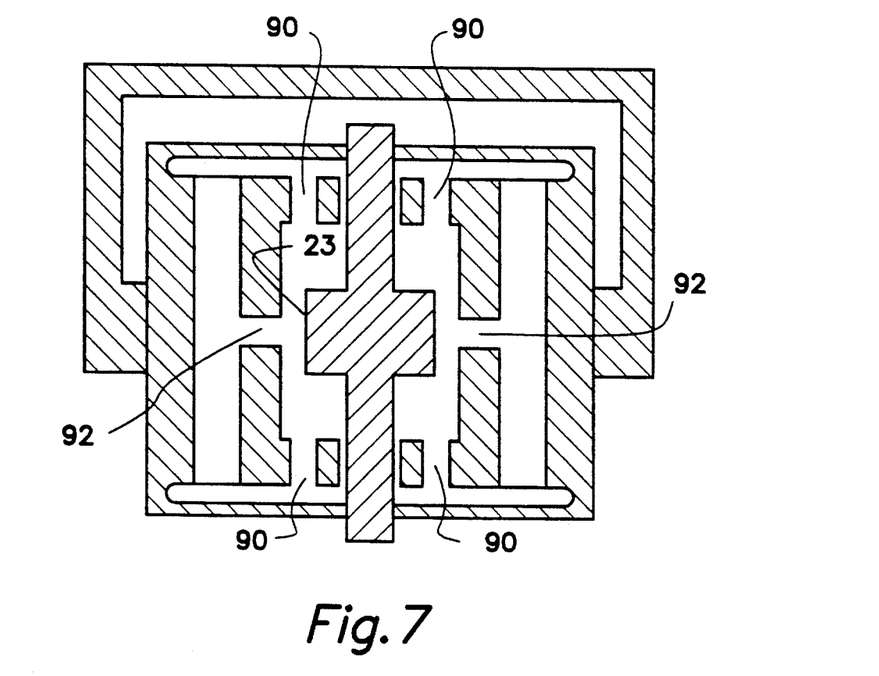
FIG. 7 is a schematic diagram of the viscous damper shown in FIG. 6 with the addition of several elements.

In extended usage, where the viscous damper 20 might be required to damp a large amplitude motion over a period of time, fluid may be pumped out of the rigid fluid volume created by the rigid housing 26 about piston 22 in chambers 82, 84 and damping annulus 72 by way of the sealing annuluses 74, 76. Although the amount of fluid lost through the sealing annuluses 74, 76 will most likely be negligible, slap could result if such a fluid void occurs in this rigid fluid volume. To avoid such slap conditions, several steps are taken with regard to the viscous damper 20, as are shown in FIG. 7. First, one way controls 90 are implemented in the rigid housing 26. These one way controls 90, channels in the rigid housing 26, allow fluid to be returned from the fluid in the slots 47 and between the rigid housing 26 and diaphragms 25, 28 to the chambers 82, 84 and damping annulus 72. For example, if the pressure of the fluid volume in the slots 47 and between the diaphragms 25, 28 and rigid housing 26 is larger than the pressure in the chamber 82, such as when a large amplitude has forced fluid out through sealing annulus 76, the one way control 90 of the upper portion of rigid housing 26 allows fluid to flow from the fluid return between diaphragm 25 and rigid housing 26 to chamber 82. This scheme allows fluid to be returned to the inner rigid volume between the rigid housing 26 and piston 22 through a one way control 90 that has a smaller resistance to flow than the sealing annuluses 74, 76. Without the one way controls 90, the higher pressure in the fluid return would only occur for a few cycles until return of fluid to the inner rigid volume would be accomplished through the sealing annulus 74.

In addition to one way controls 90 providing for relief of slap, a steady state condition may be obtained by positioning relief holes 92 in rigid housing 26 such that fluid can flow from the slots 47 to the damping annulus 72 directly when the pressure in the slots 47 is larger than the pressure in the damping annulus 72. The relief holes 92 are centered at the midpoint of the outer surface 23 of the piston body 34. The pressure in the damping annulus 72 is at an average value at the midpoint of the outer surface 23 of the piston body 34 when a pressure is applied in one of chamber 82, 84. The pressure at one edge of the damping annulus 72 will be relatively large compared to the pressure on the other edge of the damping annulus 72. A relief hole 92 centered on this midpoint will not provide fluid return to the damping annulus 72 unless this average pressure is lower than the pressure in the slots 47. By continuously watching the average pressure at the midpoint, a steady state condition without slap can be achieved. These two manners of preventing slap can either be used together or separately, one not depending on the working nature of the other.

Figure 8:
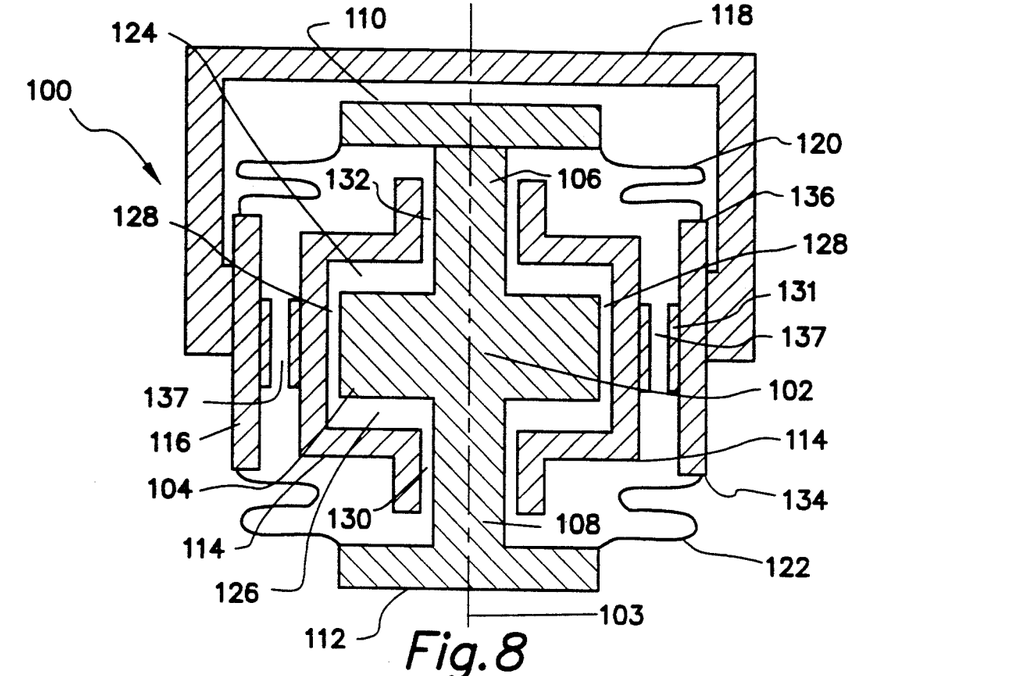
FIG. 8 is a schematic diagram of an alternative embodiment of the viscous damper of the present invention.
Figure 9:
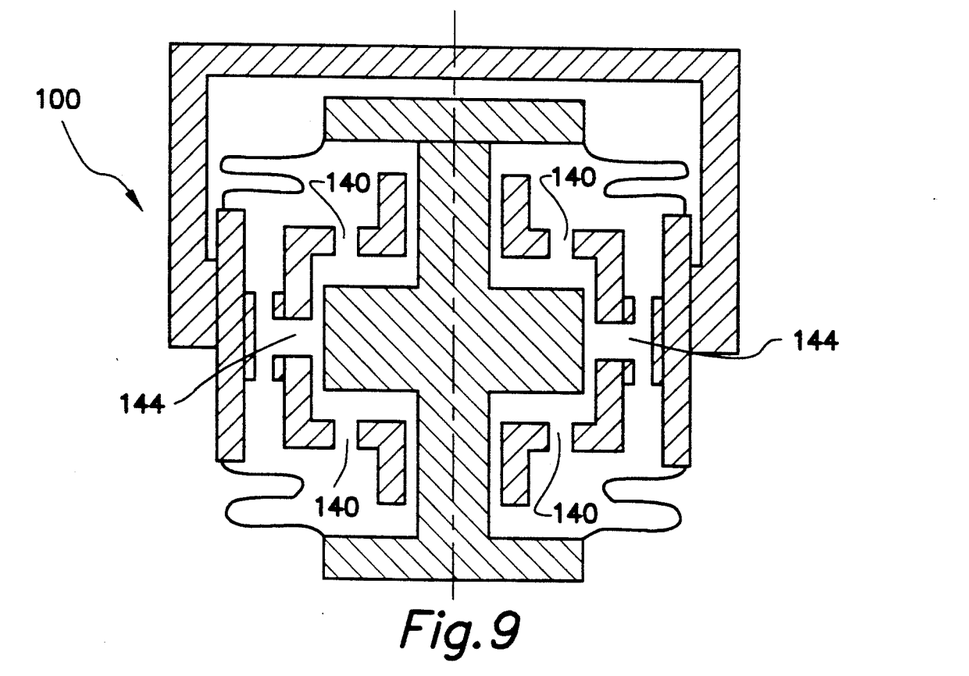
FIG. 9 is a schematic diagram of the viscous damper shown in FIG. 8 with the addition of several elements.

With respect to FIGS. 8 and 9, an alternative embodiment of a viscous damper 100 of the present invention shall be described. The viscous damper 100 includes a piston 102 having an axis 103 therethrough. The piston 102 includes a piston body 104 extending radially outward from the axis 103 between two coaxial piston ends 106, 108. An upper base member 110 connected to piston end 106 lies transverse to and extends radially from axis 103. A lower base member 112 connected to piston end 108 extends radially and transverse to axis 103. The piston ends 106, 108 and piston body 104 separate the upper and lower base member by a predetermined distance. The upper and lower base members 110, 112 can be either noncompliant structure for extending the diameter of piston ends 106, 108 for attachment of the bellows or they can be compliant structure such as diaphragms for connecting the bellows to the piston ends 106, 108. Viscous damper 100 further includes a rigid housing 114 coaxial with axis 103 and about the piston body 104 and piston ends 106, 108. The rigid housing 114 forms a first annulus 132 about piston end 106, an upper chamber fluid volume 124 between the rigid housing 114 and upper face of piston body 104, a damping annulus 128 between an outer diameter surface of the piston body 104 and an inner surface of the rigid housing 114, a lower chamber fluid volume 126 between a lower face of the piston body 104 and rigid housing 114, and a second sealing annulus 130 between an inner surface of the rigid housing and the outer surface of piston end 108. The rigid housing 114 is coupled to an outer retaining cylinder 116 by a radially extending flange 131. Thus, a rigid fluid volume is created between the rigid housing 114 and piston 102.

The outer cylindrical retainer 116 is attached at one end to a first bellows 120. The first bellows is attached at an opposite end to upper base 110. At the other end of the cylindrical retainer 116, the end of the retainer 116 is attached to a second bellows 122. The second bellows 122 is attached at an opposite end to the lower base 112. Thus, the viscous damper 100 is hermetically sealed for holding a fluid volume therein. A fluid return 130 is provided in flange 131 for return of fluid between sealing annuluses 130, 132.

As described with respect to viscous damper 20, viscous damper 100 also includes a number of fluid paths. Viscous damper 100 includes sealing annuluses 132, 130, damping annulus 128, and fluid return 137. The sealing annuluses 130, 132 are sized to have a very high resistance to fluid flow as compared to damping annulus 128. As similarly described with reference to viscous damper 20, the fluid return 137 through flange 131 and between rigid housing 114 and the first and second bellows 120, 122 provides a fluid return which has a low resistance to fluid flow as compared to damping annulus 128. Therefore, when a load is applied to load coupling 118 via the outer cylindrical housing 116 and base 112 is coupled to ground, rigid housing 114 moves axially along piston 102. Fluid is forced from upper chamber fluid volume 124 by contraction above the piston body 104 through the damping annulus 128 to an expanding lower chamber fluid volume 126 below the piston body 104. Because the high resistance to flow of the sealing annulus 130 is very large compared to damping annulus 128, there will be negligible flow therethrough. The fluid return 137 has a fluid flow resistance which is much lower than damping gap 128, so any force developed as a result of fluid sheer through the fluid return 137 is negligible. Only the damping annulus 128 provides fluid sheer for damping.

The pressure seen by the first bellows 120 and the second bellows 122 is only that due to the flow resistance of the fluid return 137 which will be extremely low when compared to that through the damping annulus 128. For this reason, the bellows 120, 122 can be made much thinner to accommodate large strokes. However, the volumetric stiffness of the bellows 120, 122 must be sufficient to retain the rigid housing 114 apart from piston 102 such that sealing annuluses 132, 130 retain open with fluid therein to prevent friction between the rigid housing 114 and piston ends 106, 108 and damping by Coulomb forces. As explained above with reference to viscous damper 20, such friction produces sticking and is unacceptable for damping of extremely low vibration levels. Just as with viscous damper 20 the rigid fluid volume between the rigid housing 114 and piston 102 allows for damping at high level forces with little pressure increase on the bellows 120, 122.

Viscous damper 100 may also experience slap when the viscous damper 100 is required to damp a large amplitude motion over a period of time. Just as viscous damper 20 prevented slap, viscous damper 100 may include one way controls 140 or relief holes 144 as shown in FIG. 9. The one way controls 140 would allow fluid to flow from the fluid return 137 back to the rigid volume between the rigid housing 114 and piston 102 in a path of less resistance than the sealing annuluses 132, 130 when the pressure in the fluid return 137 next to the first or second bellows 120, 122 is greater than that in the rigid fluid volume between the rigid housing 114 and piston 102. Similarly with regard to viscous damper 20, relief holes 144 of viscous damper 100 can provide for a steady state situation wherein slap is eliminated by providing fluid to flow from the fluid return 137 to the midpoint of the damping annulus 128 when pressure so dictates.

Those skilled in the art can recognize that only preferred embodiments of the present invention have been disclosed herein. Other advantages may be found and realized, and various modifications may be suggested by those versed in the art, and it should be understood that the embodiment shown herein may be altered and modified without departing from the true spirit and scope of the invention as defined in the accompanying claims.

What is claimed is:

1. A damping apparatus, comprising:
   a piston having an axis therethrough, said piston including a coaxial body portion and first and second ends extending oppositely therefrom along said axis;
   a rigid housing coaxial with and surrounding said body of said piston for forming a rigid fluid volume between said piston and said rigid housing, said rigid fluid volume including a first fluid volume chamber at said first end of said piston and a second fluid volume chamber at said second end of said piston, said first and second fluid volume chambers connected by a damping path; and
   a flexible housing coupled to said first and second ends of said piston and positioned radially about said rigid housing to form a fluid return of lower resistance to fluid flow than said damping path between said rigid housing and said flexible housing and to allow movement of said rigid housing with respect to said piston, said rigid housing forming a first and second restrictive path about said first and second ends of said piston, respectively, of higher resistance to fluid flow than said damping path to allow fluid flow between said fluid return and said rigid fluid volume.

2. An apparatus according to claim 1, wherein said rigid housing includes a fluid path coupling said rigid fluid volume and said fluid return at the midpoint of said body of said piston.

3. An apparatus according to claim 2, wherein said rigid housing includes one way flap means for allowing fluid flow from said fluid return to either of said first fluid volume chamber or said second fluid volume chamber.

4. An apparatus according to claim 1, wherein said rigid housing includes one way flap means for allowing fluid flow from said fluid return to either of said first fluid volume chamber or said second fluid volume chamber.

5. An apparatus according to claim 1, wherein said damping path includes an annulus between the rigid housing and an outer surface of said coaxial body portion of said piston.

6. An apparatus according to claim 5, wherein said first and second restrictive paths include first and second annuluses between said rigid housing and said first and second ends of said piston, respectively.

7. An apparatus according to claim 1, wherein a cross sectional area of said first and second restrictive paths is relatively small compared to a cross sectional area of said damping path and said cross sectional area of said damping path is relatively small when compared to a cross sectional area of said fluid return, whereby displacement of fluid is allowed from said first fluid volume chamber to said second fluid volume chamber with little loss of fluid to said fluid return and with minimal pressure on said flexible housing.

8. An apparatus according to claim 1, wherein said damping path, said first and second restrictive paths, and said fluid return are sized to keep a pressure in said fluid return low as compared to said rigid fluid volume, whereby said flexible housing is compliant to permit a large stroke while achieving a high load and high velocity damping capability.

9. A damping apparatus, comprising:
   a member having an axis therethrough;
   a first housing forming a fluid volume about and coaxial with said axis, said member including means for separating said fluid volume into a first fluid chamber and a second fluid chamber connected by a damping path for providing damping of applied forces;

a second housing coaxial with said axis and positioned substantially radially about said first housing providing a fluid return between said first housing and said second housing having a resistance to flow lower than a resistance to flow of said damping path and to allow movement of said first housing with respect to said member;

a first high resistance path about said member for flow of fluid between said fluid return and said first fluid chamber and a second high resistance path about said member for flow of fluid between said fluid return and said second fluid chamber, each of said first and second high resistance paths having a resistance to flow greater than the resistance to flow of said damping path, said first and second housing including means for continually retaining said first and second high resistance paths about said member when a load is applied to the damping apparatus to prevent contact and friction between said first housing and said member.

10. An apparatus according to claim 9, wherein said first housing includes means for filling a void in said fluid volume created by loss of fluid from said fluid volume to said fluid return via said first and second high resistance paths.

11. A damping apparatus, comprising:

a piston having an axis therethrough, said piston including a coaxial body portion and first and second ends extending oppositely therefrom along said axis;

a rigid housing coaxial and surrounding said body of said piston for forming a rigid fluid volume in between said piston and said rigid housing, said rigid fluid volume including a first fluid volume chamber at said first end of said piston and a second fluid volume chamber at said second end of said piston, said first and second fluid volume chambers connected by a damping path, said rigid housing further including a radial member coaxial with said body portion of said piston and extending from said rigid housing for connecting to and receiving a load;

an upper and lower base member coupled to said first and second ends of said piston, respectively;

a first bellows having a first end connected to said upper base member of said piston and a second end connected to said radial member;

a second bellows having a first end connected to said lower base member of said piston and a second end connected to said radial member, said first and second bellows for forming a fluid return about said rigid housing extending through said radial member and for allowing movement of said rigid housing with respect to said piston, said fluid return of lower resistance to fluid flow than said damping path, said rigid housing forming a first and second restrictive path about said first and second ends of said piston, respectively, of higher resistance to fluid flow than said damping path to allow fluid flow between said fluid return and said rigid fluid volume.

12. An apparatus according to claim 11, wherein said first and second restrictive paths include annuluses between said rigid housing and said first and second ends of said piston, respectively.

13. An apparatus according to claim 12, wherein said first and second bellows are of a material having a stiffness such that said first and second annuluses are retained about said first and second ends of said piston when a load is applied to the damping apparatus to prevent contact and friction between said rigid housing and said piston.

14. An apparatus according to claim 11, wherein one of said upper and lower base members of said piston and said radial member are coupled to a first and second flexible pivot, respectively.

15. An apparatus according to claim 11, wherein said rigid housing includes a fluid path coupling said rigid fluid volume and said fluid return at the midpoint of said body of said piston.

16. An apparatus according to claim 15, wherein said rigid housing includes one way flap means for allowing fluid flow from said fluid return to either of said first fluid volume chamber or said second fluid volume chamber.

17. An apparatus according to claim 11, wherein said rigid housing includes one way flap means for allowing fluid flow from said fluid return to either of said first fluid volume chamber or said second fluid volume chamber.

18. A damping apparatus, comprising;

a piston having an axis therethrough, said piston including a coaxial body portion and first and second ends extending oppositely therefrom along said axis;

a rigid housing coaxial with and surrounding said body of said piston for forming a rigid fluid volume between said piston and said rigid housing, said rigid fluid volume including a first fluid volume chamber at said first end of said piston and a second fluid volume chamber at said second end of said piston, said first and second fluid volume chambers connected by a damping path; and a flexible housing coupled to said first and second ends of said piston and about said rigid housing to form a fluid return of lower resistance to fluid flow than said damping path between said rigid housing and said flexible housing and to allow movement of said rigid housing with respect to said piston, said rigid housing forming a first and second restrictive path about said first and second ends of said piston, respectively, of higher resistance to fluid flow than said damping path to allow fluid flow between said fluid return and said rigid fluid volume, said flexible housing including:

a cylindrical outer retainer coaxial with said axis of said piston, said retainer having first and second ends;

a first diaphragm centered on and retaining said first end of said piston and sealing said first end of said cylindrical outer retainer; and a second diaphragm centered on and retaining said second end of said piston and sealing said second end of said cylindrical outer retainer.

19. An apparatus according to claim 18, wherein said rigid housing includes a fluid path coupling said rigid fluid volume and said fluid return at the midpoint of said body of said piston.

20. An apparatus according to claim 19, wherein said rigid housing includes one way flap means for allowing fluid flow from said fluid return to either of said first fluid volume chamber or said second fluid volume chamber.

21. An apparatus according to claim 18, wherein said first and second restrictive paths include first and second annuluses between said rigid housing and said first and second ends of said piston, respectively, and wherein said rigid housing is sized with respect to said cylindrical outer retainer so as to retain said first and second annuluses about said first and second ends of said piston when a load is applied to the damping apparatus to prevent contact and friction between said rigid housing and said piston.

22. An apparatus according to claim 18, wherein said rigid housing includes one way flap means for allowing fluid flow from said fluid return to either of said first fluid volume chamber or said second fluid volume chamber.

23. An apparatus according to claim 18, further comprising a load member connected to said flexible housing and to a first flexible pivot, one of said first or second ends of said piston connected to a second flexible pivot.

* * * * *